UNITED STATES PATENT OFFICE.

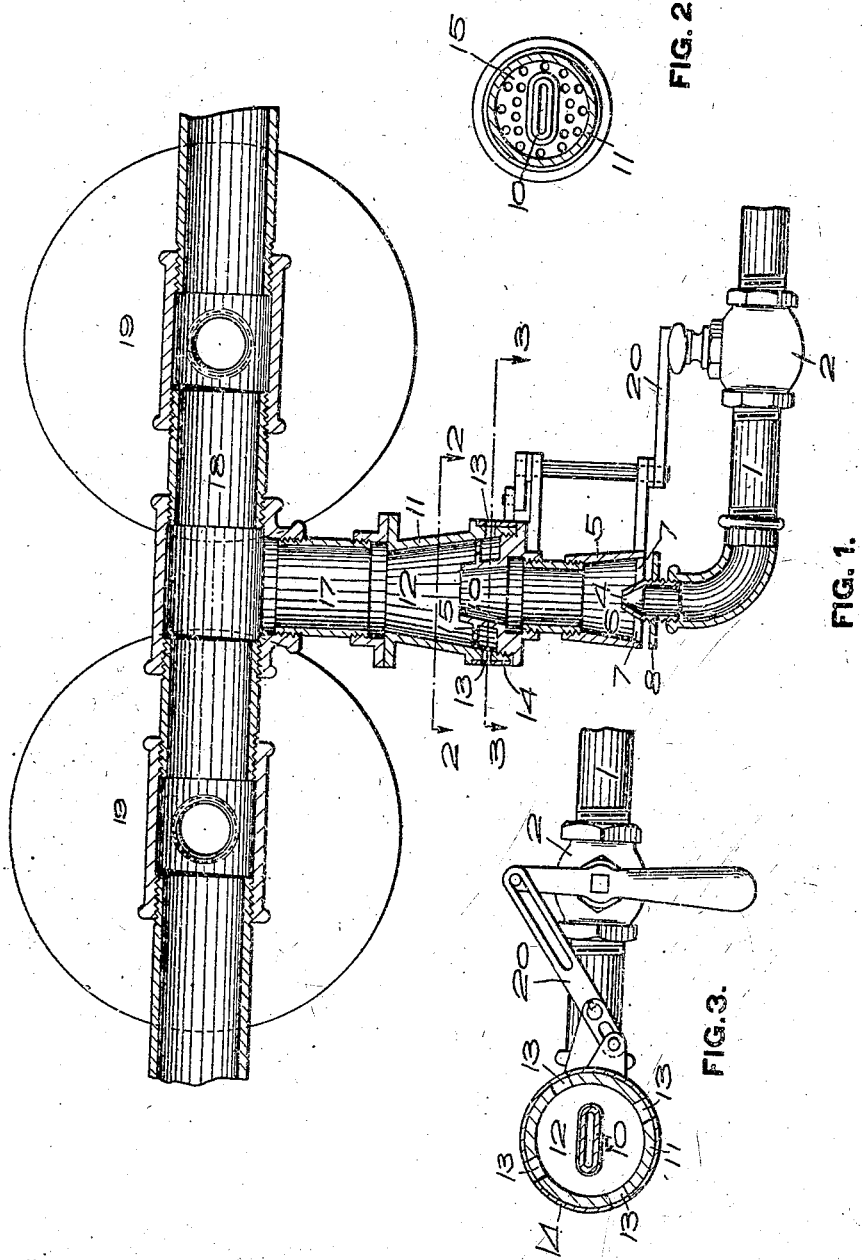

GEORGE L. FOGLER, OF BALTIMORE, MARYLAND, ASSIGNOR TO HARRY B. BRYSON, OF PITTSBURG, PENNSYLVANIA.

AIR AND GAS MIXER FOR EXPLOSIVE-ENGINES.

954,507.  Specification of Letters Patent.  Patented Apr. 12, 1910.

Application filed February 20, 1909. Serial No. 479,179.

*To all whom it may concern:*

Be it known that I, GEORGE L. FOGLER, a resident of Baltimore, in the State of Maryland, have invented a new and useful Improvement in Air and Gas Mixers for Explosive-Engines, of which the following is a specification.

This invention relates to air and gas mixers for explosive engines.

The object of the invention is to provide a device of this kind whereby either a very lean or a rich mixture can be produced.

The essential feature of the invention consists in providing a preliminary mixing chamber in which the gas is mixed with air and reduced to atmospheric pressure, together with a second mixing chamber into which the mixture from the first chamber is drawn by the suction of the engine and wherein it is mixed with a further supply of air entering said chamber at the same velocity and pressure as the gas mixture.

In the accompanying drawings Figure 1 is a sectional view through my improved mixer showing the application thereof to a pair of cylinders of an explosive engine, and Figs. 2 and 3 are cross-sections taken respectively on lines 2—2 and 3—3 of Fig. 1.

The gas supply pipe is shown at 1. This may be connected to a gas main or any other suitable source of artificial or natural gas or to a vaporizer wherein gasolene or other oil is converted into gas. This supply pipe is provided with suitable regulating and cut-off valve 2. This pipe communicates with a nozzle 4 projecting through the end of a casing 5 inclosing the preliminary mixing chamber 6. The end of the casing 5 around nozzle 4 is provided with openings 7 for the admission of air, which openings can be adjusted by a suitable valve 8. The gas entering through nozzle 6 draws in through the openings 7 a proper amount of air which is mixed with the gas in the chamber 6. In this chamber the mixture is reduced to atmospheric pressure, or practically so. The opposite end of the chamber 6 is connected to nozzle 10 projecting through the end of casing 11 inclosing the second mixing chamber 12. The casing 11 near its base is provided with air openings 13 which are controlled by a valve 14. Between the nozzle 10 and chamber walls 11 in advance of the air openings 13 is a plate 15 provided with a large number of small perforations through which the air entering through 13 must pass and whereby it is broken up into small streams. The mixing chamber 12 is connected by pipe 17 to a manifold 18 to which may be connected one or more cylinders 19 of an explosive engine. The drawing shows two such cylinders and shows the ends of the manifold broken off to indicate that any number of cylinders may be supplied therefrom. The mixing chambers and nozzles may be of any desired shape in cross-section, the chambers being shown circular while the nozzle 10 is shown oval or oblong. Both the chambers and nozzles are preferably tapered from their inlet to their outlet ends as shown. The preliminary mixing chamber 6 may be omitted in some cases.

In the use of the mixer the gas comes either from the supply main or vaporizer through supply pipe 1. It enters chamber 6 through the nozzle 4, and if it comes from a gas main it enters at considerable velocity, due to its pressure, and draws in through the opening 7 a quantity of air which is mixed with the gas in chamber 6 and the mixture therein reduced practically to atmospheric pressure. If supply pipe 1 comes from an oil vaporizer the gas has practically no pressure, and is drawn into chamber 6 by the suction of the engine. This mixture is drawn through the nozzle 10 into chamber 12 by the suction of the engine cylinders, and this suction also draws in a further quantity of air through the openings 13 in casing 11. The air enters chamber 12 through the perforated plate 15 and is mixed with the mixture coming from the preliminary mixing chamber. The quantity of air coming through openings 13 is regulated by the valve 14, to admit the right quantity of air proportionate to the suction of the engine. The air regulating valve 14 and the gas supply valve 2 are preferably connected to be operated in unison so that when the gas is cut off more or less the air is proportionately reduced. Various forms of mechanical connections between these valves to accomplish their simultaneous movement will readily suggest themselves. The drawing shows diagrammatically suitable mechanism indicated generally at 20 for this purpose, and comprising a lever secured to the valve 2 and having a pin entering a slot in an arm on a vertical rock shaft, which at its upper end carries another arm having a slot and pin connection with a projection on air valve 14.

It is well known in the operation of explosive engines the leaner the mixture the better is the explosion providing the proper compression is secured. By providing for a double mixing of air with the gas, that is, a preliminary mixing in chamber 6 and a second mixing in chamber 12, I provide for a very lean mixture, one much leaner than could be obtained by a single mixing which depends upon drawing in air by the velocity of the gas, as with prior devices. I utilize the suction of the engine to provide the second supply of air, when gas is used, and to provide both the first and second supply of air when oil or gasolene is used. In the latter case more air must be taken in at the openings 13 than in case where gas is used. The mixture can be made of any desired richness by properly regulating the valve 14.

What I claim is:

1. An air and gas mixer for explosive engines comprising a preliminary mixing chamber provided with a gas inlet and air openings around the same, a second mixing chamber having means at its top for connection to the inlet of an explosive engine cylinder and having projecting through its base a tapered nozzle communicating with the preliminary mixing chamber and being provided with air openings around said nozzle, and a perforated plate between the nozzle and walls of said mixing chamber and in advance of the air openings.

2. An air and gas mixer for explosive engines comprising a preliminary mixing chamber provided with gas inlet nozzle and air openings around the same, a second tapering mixing chamber, a tapering nozzle connected to the first chamber and projecting into the second chamber, a perforated plate between said second nozzle and the chamber walls, an air opening being provided into the base of said chamber below said perforated plate, and a valve controlling said air opening.

3. An air and gas mixer for explosive engines comprising a preliminary mixing chamber provided with a gas inlet and air openings around the same, a second mixing chamber having means at its top for connection to the inlet of an explosive engine cylinder and having projecting through its base a nozzle communicating with the preliminary mixing chamber and being provided with air openings around said nozzle, and a perforated plate between the nozzle and chamber walls and in advance of the air openings, and a connection from the second mixing chamber to the inlet of a gas engine, whereby the suction of the engine draws air and gas into the mixer.

4. An air and gas mixer for explosive engines, comprising a mixing chamber arranged for connection to the inlet of an explosive engine cylinder, a tapering nozzle projecting into said mixing chamber and arranged for connection to a supply of gaseous fuel and a perforated plate between said inlet and the chamber walls, said chamber being provided with air openings below said perforated plate.

5. An air and gas mixer for explosive engines, comprising a mixing chamber arranged for connection to the inlet of an explosive engine cylinder, a nozzle projecting through the base of said mixing chamber and arranged for connection to a supply of gaseous fuel, said mixing chamber being provided with air openings around said fuel supply connection, and a perforated plate between the nozzle and chamber walls and in advance of the air openings.

6. An air and gas mixer for explosive engines, comprising a tapering mixing chamber arranged for connection to the inlet of an explosive engine cylinder, a tapering nozzle arranged for connection to a supply of gaseous fuel and projecting into said chamber, a perforated plate between said tapering nozzle and the chamber walls, an air opening being provided into the base of said chamber below said perforated plate, and a valve controlling said air opening.

7. In explosive engines, the combination with a cylinder and a supply connection thereto for gaseous fuel, of an air and gas mixer in said connection and comprising a tapering mixing chamber having its smaller end connected to the engine cylinder and provided with air openings in its other end, a nozzle connected to the fuel supply and projecting into the other end of the mixing chamber beyond the air openings, and a perforated plate between said nozzle and the chamber walls in advance of the air openings.

In testimony whereof, I have hereunto set my hand.

GEORGE L. FOGLER.

Witnesses:
 JOHN S. CORT,
 F. W. WINTER.